United States Patent
Konuma

(10) Patent No.: US 8,022,811 B2
(45) Date of Patent: Sep. 20, 2011

(54) WIRELESS TAG READER AND WIRELESS TAG STATUS INFERENCE APPARATUS, SYSTEM, AND PROGRAM

(75) Inventor: Ryouhei Konuma, Osaka (JP)

(73) Assignee: OKI Electric Industry Co., Ltd, Tokyo (JP)

( * ) Notice: Subject to any disclaimer, the term of this patent is extended or adjusted under 35 U.S.C. 154(b) by 916 days.

(21) Appl. No.: 12/010,038

(22) Filed: Jan. 18, 2008

(65) Prior Publication Data

US 2008/0278294 A1    Nov. 13, 2008

(30) Foreign Application Priority Data

Mar. 6, 2007  (JP) .................................. 2007-055951
Jul. 30, 2007  (JP) .................................. 2007-197386

(51) Int. Cl.
*G05B 23/02* (2006.01)
*H03K 23/00* (2006.01)

(52) U.S. Cl. ........... 340/10.1; 340/3.43; 377/37; 377/39

(58) Field of Classification Search .......... 340/3.1–3.71, 340/6.1, 8.1, 9.1–9.17, 10.1–10.6, 539.13, 340/572.1–572.4; 342/10.42

See application file for complete search history.

(56) References Cited

U.S. PATENT DOCUMENTS

| 4,255,809 | A | * | 3/1981 | Hillman | ......................... 377/28 |
| 5,771,274 | A | * | 6/1998 | Harris | ........................ 379/22.03 |
| 6,843,415 | B2 | * | 1/2005 | Vogler | .......................... 235/385 |
| 7,088,229 | B2 | * | 8/2006 | Johnson | ........................ 340/505 |

FOREIGN PATENT DOCUMENTS

| JP | 2002-165825 | 6/2002 |
| JP | 2002-230109 | 8/2002 |
| JP | 2005-293348 | 10/2005 |

* cited by examiner

*Primary Examiner* — Daniel Wu
*Assistant Examiner* — John Bamert
(74) *Attorney, Agent, or Firm* — Rabin & Berdo P.C.

(57) ABSTRACT

A system including wireless tags that transmit information from fixed locations to nearby wireless tag readers possessed by moving persons also includes a wireless tag status inference apparatus to which the wireless tag readers send identifying information received from the wireless tags. The wireless tag status inference apparatus logs the information received from the wireless tag readers, and compares the logged information with a stored list of installed wireless tags to identify suspected inoperable wireless tags. Wireless tags requiring replacement or repair can thereby be identified promptly and inexpensively, without the need to dispatch personnel on periodic inspection tours of all areas in which the wireless tags are installed.

18 Claims, 15 Drawing Sheets

| ENCOUNTER NUMBER | ID NUMBER |
|---|---|
| 1 | 111 |
| 2 | 105 |
| 3 | 107 |
| 4 | 108 |
| 5 | 107 |
| 6 | 109 |
| 7 | 110 |

| LOTTERY SEQUENCE | ENCOUNTER NUMBER | ID NUMBER |
|---|---|---|
| 1 | 3 | 107 |
| 2 | 6 | 109 |
| 3 | 5 | 107 |
| 4 | 1 | 111 |
| 5 | 2 | 105 |
| 6 | 4 | 108 |
| 7 | 7 | 110 |

| TRANSMISSION SEQUENCE NUMBER | ID NUMBER |
|---|---|
| 1 | 107 |
| 2 | 109 |
| 3 | 111 |
| 4 | 105 |
| 5 | 108 |
| 6 | 110 |

FIG.6

| ID NUMBER | INSTALLATION LOCATION INFORMATION |
|---|---|
| 101 | N. LAT. 35°40′53″, E. LONG. 139°45′57″ |
| 102 | N. LAT. 35°40′51″, E. LONG. 139°45′57″ |
| 103 | N. LAT. 35°40′50″, E. LONG. 139°45′57″ |
| 104 | N. LAT. 35°40′53″, E. LONG. 139°45′59″ |
| 105 | N. LAT. 35°40′52″, E. LONG. 139°45′59″ |
| 106 | N. LAT. 35°40′51″, E. LONG. 139°45′59″ |
| 107 | N. LAT. 35°40′53″, E. LONG. 139°45′60″ |
| 108 | N. LAT. 35°40′53″, E. LONG. 139°45′61″ |
| 109 | N. LAT. 35°40′51″, E. LONG. 139°45′60″ |
| 110 | N. LAT. 35°40′51″, E. LONG. 139°45′61″ |
| 111 | N. LAT. 35°40′52″, E. LONG. 139°45′58″ |

FIG.7

| ID NUMBER | LOG COUNT |
|---|---|
| 101 | 0 |
| 102 | 0 |
| 103 | 0 |
| 104 | 0 |
| 105 | 0 |
| 106 | 0 |
| 107 | 0 |
| 108 | 0 |
| 109 | 0 |
| 110 | 0 |
| 111 | 0 |

FIG.8

| ID NUMBER | LOG COUNT |
|---|---|
| 101 | 0 |
| 102 | 0 |
| 103 | 0 |
| 104 | 0 |
| 105 | 1 |
| 106 | 0 |
| 107 | 1 |
| 108 | 1 |
| 109 | 1 |
| 110 | 1 |
| 111 | 1 |

| ID NUMBER | LOG COUNT |
|---|---|
| 101 | 1 |
| 102 | 3 |
| 103 | 3 |
| 104 | 0 |
| 105 | 4 |
| 106 | 0 |
| 107 | 5 |
| 108 | 5 |
| 109 | 7 |
| 110 | 7 |
| 111 | 6 |

| ID NUMBER | INSTALLATION LOCATION INFORMATION |
|---|---|
| 104 | N. LAT. 35° 40′ 53″, E. LONG. 139° 45′ 59″ |
| 106 | N. LAT. 35° 40′ 51″, E. LONG. 139° 45′ 59″ |

| ID NUMBER | INSTALLATION LOCATION INFORMATION AREA. SUBAREA. WIRELESS TAG POSITION. SUB-NUMBER |
|---|---|
| 106a | Y STATION. NEAR ELEVATOR. 1. 1 |
| 106b | Y STATION. NEAR ELEVATOR. 1. 2 |
| 106c | Y STATION. NEAR ELEVATOR. 1. 3 |
| 106d | Y STATION. NEAR ELEVATOR. 1. 4 |
| 106e | Y STATION. NEAR ELEVATOR. 1. 5 |
| 106f | Y STATION. NEAR ELEVATOR. 1. 6 |

501 = ID NUMBER column
502 = INSTALLATION LOCATION INFORMATION column

WIRELESS TAG READER AND WIRELESS TAG STATUS INFERENCE APPARATUS, SYSTEM, AND PROGRAM

BACKGROUND OF THE INVENTION

1. Field of the Invention

The present invention relates to apparatus for reading wireless tags, and to an apparatus, system, and program for inferring the status of the wireless tags.

2. Description of the Related Art

The technology of placing wireless tags in roadways and other public facilities to provide location-specific information to moving persons has reached the initial stage of deployment. In a system described in Japanese Patent Application Publication No. 2002-165825 and illustrated in the block diagram in FIG. 1, for example, wireless tags are embedded in guidance blocks provided in paved walkways to aid visually impaired pedestrians. The pedestrian has a wireless tag reader 20 including an electronic cane operable to communicate with the wireless tags 1301 and a data communication device operable to communicate with a guidance information database 1303 disposed at a central site. When the pedestrian's electronic cane reads an identification number from a wireless tag 1301, the data communication device queries the guidance information database 1303 to obtain corresponding information, which is provided to the pedestrian by audible means.

In an intelligent traffic system described in Japanese Patent Application Publication No. 2005-293348, wireless tags are embedded in roads to assist drivers of motor vehicles. A wireless tag reader mounted in a vehicle reads information stored in the wireless tags as the vehicle speeds past, and advises the driver about road conditions ahead.

Since the wireless tags in these and other such systems are generally installed in heavily trafficked outdoor locations, they are subject to wear and tear and are exposed to the elements. These factors can cause tags to malfunction, denying needed information to the user. Japanese Patent Application Publication No. 2002-230109 therefore proposes an inspection system in which a vehicle equipped with wireless tag communication equipment is driven over a course along which wireless tags are installed to determine the operational status of the tags.

The proposed inspection system is labor-intensive, however, as it requires inspection personnel to operate the vehicle and tour all sites where wireless tags are installed. Since labor-intensive inspection tours tend not to be made at frequent intervals, the proposed system is also slow in identifying inoperable tags.

SUMMARY OF THE INVENTION

An object of the present invention is to enable the status of wireless tags to be inferred without the need to dispatch inspection personnel to the sites where the tags are installed.

Another object of the invention is to enable the status of inoperable wireless tags to be determined promptly.

The invention provides a wireless tag status inference system comprising a wireless tag status inference apparatus for inferring the status of wireless tags disposed along a route traversable by a moving person, and at least one wireless tag reader usable by a moving person to acquire information from wireless tags nearby.

The wireless tag status inference apparatus includes a wireless tag information storage unit that stores information pertaining to the wireless tags, a log compiling unit that compiles wireless tag information acquired by the wireless tag reader from some or all of the wireless tags as the moving person traverses the route, and a tag status inference unit for identifying suspected inoperable wireless tags from the information stored in the wireless tag information storage unit and the information compiled by the log compiling unit. In one scheme, a wireless tag is inferred to be inoperable if it is logged infrequently or not at all, despite the logging of other wireless tags in its vicinity.

The wireless tag reader includes a first communication device for acquiring information from nearby wireless tags, and a second communication device for transmitting the acquired information to the wireless tag status inference apparatus. The acquired information is preferably transmitted in a form that prevents an operator of the wireless tag status inference apparatus from tracing the movements of the moving person precisely.

The invented system enables the wireless tags to be inspected on the basis of the information they provide during normal use, without requiring inspection tours by maintenance personnel. Suspected inoperable wireless tags can be identified at low cost. Maintenance personnel can proceed promptly to the suspected inoperable wireless tags and repair or replace them if necessary.

BRIEF DESCRIPTION OF THE DRAWINGS

In the attached drawings:

FIG. 6 is an exemplary table of information stored in the tag information memory in the first embodiment;

FIG. 7 is an exemplary table of information stored in the tag log in the wireless tag status inference apparatus in the first embodiment;

FIG. 8 is an exemplary table of information, acquired from one wireless tag reader during one traverse of a route, stored in the tag log in the wireless tag status inference apparatus;

FIGS. 14, 15, 16, and 17 illustrate exemplary arrangements of wireless tags in a second embodiment;

FIG. 20 shows an example of information stored in the tag information memory in a third embodiment.

DETAILED DESCRIPTION OF THE INVENTION

Figure 1:
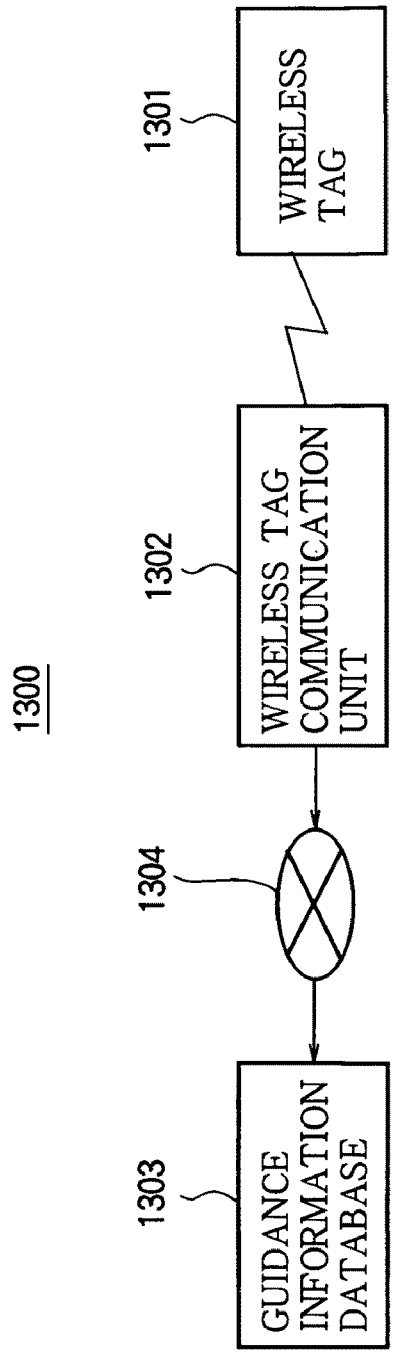
FIG. 1 is a block diagram of a known system using wireless tags to aid visually impaired pedestrians.

Embodiments of the invention will now be described with reference to the attached drawings, in which like elements are indicated by like reference characters.

First Embodiment

Figure 2:
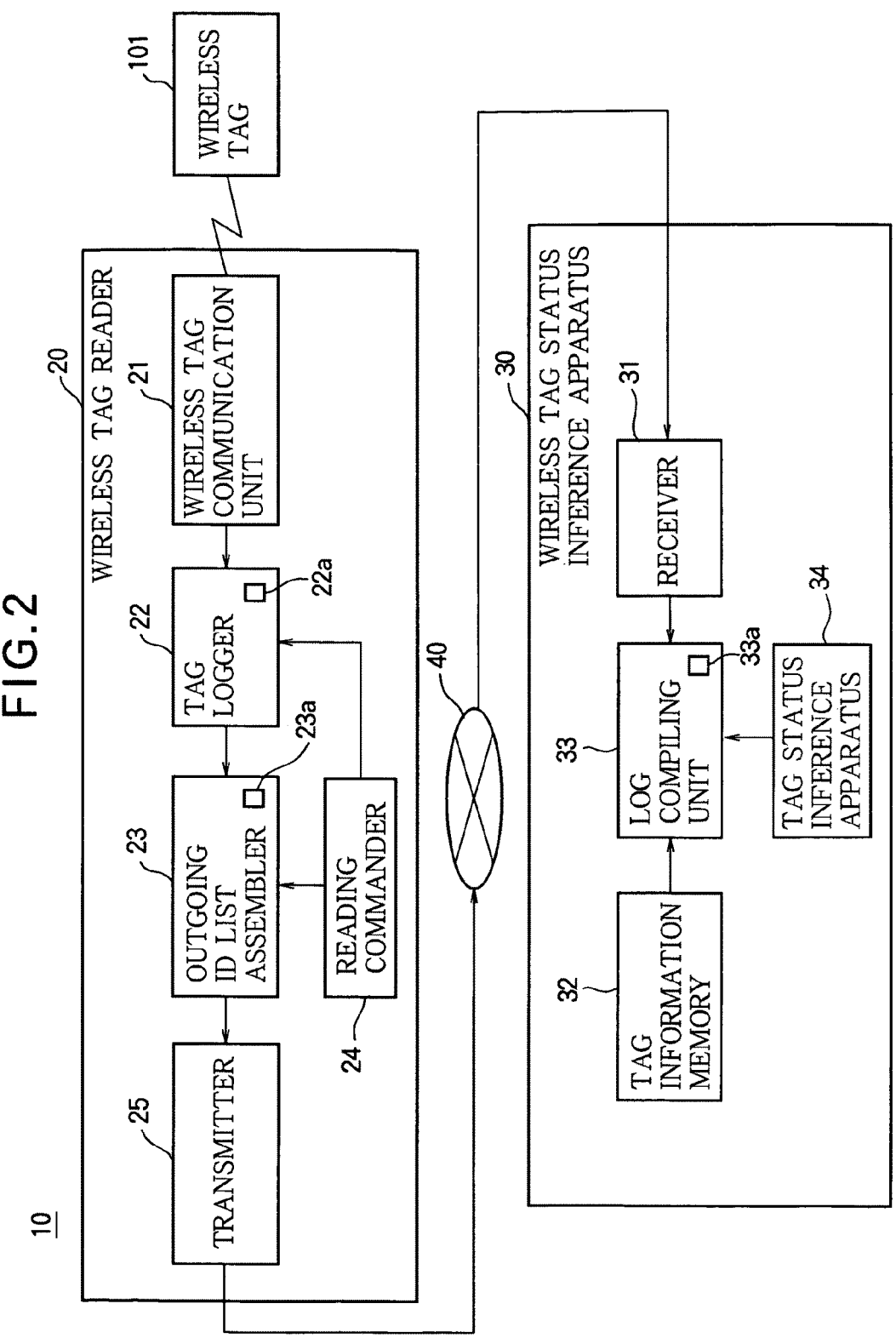
FIG. 2 is a block diagram of a wireless tag status inference system illustrating a first embodiment of the invention.

Referring to FIG. 2, the first embodiment is a wireless tag status inference system 10 that adds a wireless tag status inference apparatus 30 to the system for aiding visually impaired pedestrians illustrated in FIG. 1.

The wireless tags in this system include integrated circuits (ICs) and are operable to communicate by radio signals with a wireless tag reader 20. So-called radio-frequency identification (RFID) tags are one example of such wireless tags. Each wireless tag has a unique identification (ID) number, which it transmits when interrogated by the wireless tag reader 20. Although only one wireless tag 101 is shown in FIG. 2, the system normally includes a plurality of wireless tags.

The wireless tag reader 20 communicates with the wireless tag 101 to obtain its ID number, and submits the ID number to the wireless tag status inference apparatus 30. The wireless tag reader 20 comprises a wireless tag communication unit 21, a tag logger 22, an outgoing ID list assembler 23, a reading commander 24, and a transmitter 25. Although only one wireless tag reader 20 is shown in FIG. 2, the system normally includes a plurality of wireless tag readers 20. The wireless tag reader 20 may be incorporated in an electronic cane used by a visually impaired person, or in a portable information processing device equipped with an RFID reader. If the wireless tag reader 20 is used in a vehicle, it may be attached to the underside of the chassis of the vehicle.

The wireless tag communication unit 21 serves as an interface for communication with the wireless tag 101. When the wireless tag communication unit 21 detects a wireless tag 101 with which it can communicate, it interrogates the wireless tag 101 to obtain its ID number, and passes the obtained ID number to the tag logger 22.

The tag logger 22 stores ID numbers received from the wireless tag communication unit 21 in a tag log memory 22a, and sends the ID numbers to the outgoing ID list assembler 23. The tag logger 22 also monitors the times when the user of the wireless tag reader 20 enters and leaves the neighborhood of a wireless tag 101. The time of entering may be defined as the time when the tag logger 22 first receives the ID number of the wireless tag 101, and the time of leaving may be defined as the end of a predetermined duration of time during which the tag logger does not again receive the ID number of the wireless tag 101 from the wireless tag communication unit 21. Alternatively, the time of leaving may be the time when the user stops receiving guidance service, or the time when the wireless tag reader 20 moves out of communication range of the wireless tag 101.

Figure 3:
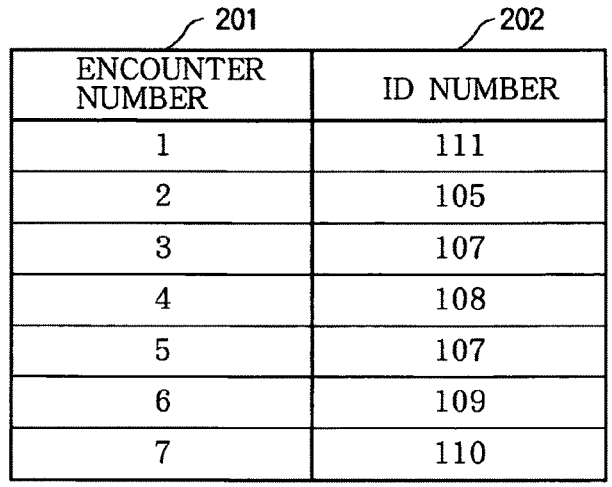
FIG. 3 is an exemplary table of tags encountered by a pedestrian, listed in sequence of encounter.

FIG. 3 is an exemplary table listing tags encountered by a pedestrian in their sequence of encounter. The tag log memory 22a temporarily stores the ID numbers received from the wireless tag communication unit 21, storing both encounter numbers 201 and the ID numbers 202. The encounter numbers 201 are recorded as an ascending sequence of integers starting from '1'. Each time the pedestrian enters the vicinity of a wireless tag 101, the tag logger 22 writes its ID number 202 in the tag log memory 22a, paired with the next encounter number 201 in the ascending sequence.

The tag logger 22 sends the ID numbers 202 stored in the tag log memory 22a to the outgoing ID list assembler 23 in a sequence determined by the reading commander 24, as described below. The tag logger 22 obtains this sequence from the reading commander 24 by sending the reading commander 24 the value of the last encounter number 201 stored in the tag log memory 22a, that is, the maximum encounter number 201.

When supplied with a maximum encounter number 201 by the tag logger 22, the reading commander 24 generates a random sending sequence for the ID numbers 202 stored in the tag log memory 22a. The reading commander 24 includes a random number generator such as a pseudorandom number generator. The reading commander 24 uses the random numbers generated by the random number generator to shuffle the integers from '1' to the maximum encounter number 201 supplied by the tag logger 22 into a random sequence of what will be referred to as lottery numbers, performing essentially the same operation as when lottery numbers are drawn at random from a box until the box is empty. The reading commander 24 sends the randomized lottery numbers to the reading commander 24 in the sequence in which they are 'drawn'. A simple procedure is to have the random number generator generate random integers from '1' to the maximum encounter number 201, ignore each integer that has already been generated, and continue until no integers are left. Upon receiving each lottery number, the tag logger 22 reads the corresponding ID number 202 from the tag log memory 22a and sends it to the outgoing ID list assembler 23.

Figure 4:
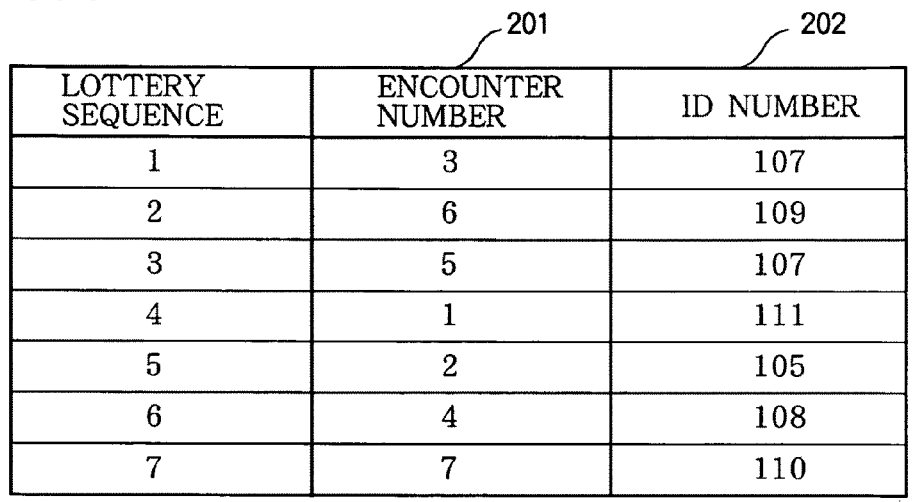
FIG. 4 is a corresponding table of information sent from the tag logger to the log reader in the first embodiment.

FIG. 4 is a table illustrating this procedure for the information shown in FIG. 3. If the sequence of lottery numbers generated by the reading commander 24 is '3', '6', '5', '1', '2', '4', '7', then the tag logger 22 first sends the ID number corresponding to encounter number '3', namely ID number '107', to the outgoing ID list assembler 23. Continuing in this way, the tag logger 22 sends the outgoing ID list assembler 23 the ID numbers 202 in the randomized sequence '107', '109', '107', '111', '105', '108', '110'.

The reading commander 24 may also respond to a query from the outgoing ID list assembler 23 by informing it whether there is still an ID number left to be read, that is, whether there is still a lottery number left to be sent to the tag logger 22.

The outgoing ID list assembler 23 receives the ID numbers 202 stored in the tag log memory 22a from the tag logger 22, assembles a list of information to be sent to the wireless tag status inference apparatus 30, and sends this information to the transmitter 25, as described below. The outgoing ID list assembler 23 includes an outgoing ID number memory 23a.

Figure 5:
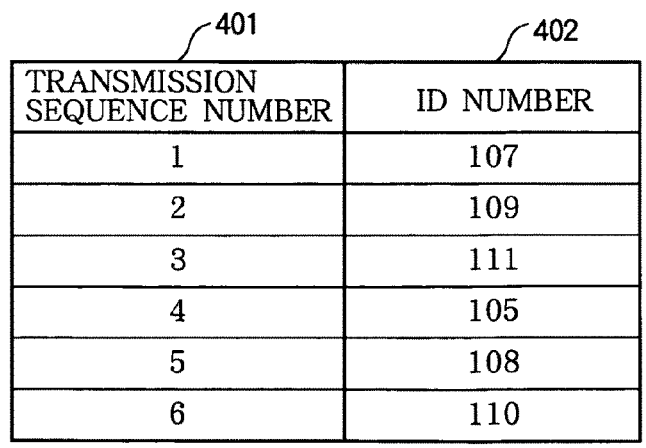
FIG. 5 is a corresponding table of information stored in the outgoing ID number memory.

The outgoing ID number memory 23a is a temporary storage area for information that the outgoing ID list assembler 23 provides to the transmitter 25. Referring to FIG. 5, the outgoing ID number memory 23a is organized as a table of transmission sequence numbers 401 and ID numbers 402. The ID numbers 402 are identical to the ID numbers 202 stored in the tag log memory 22a. The transmission sequence numbers 401 indicate the sequence in which the ID numbers 402 will be sent to the transmitter 25.

The outgoing ID list assembler 23 accordingly receives the ID numbers 202 stored in the tag log memory 22a, and stores them in the outgoing ID number memory 23a together with transmission sequence numbers 401 indicating the sequence in which they have been received. If the value of the first ID number sent from the tag logger 22 is '107' for example, the outgoing ID list assembler 23 writes '1' in the outgoing ID number memory 23*a* as a transmission sequence number 401, and writes '107' as the corresponding ID number 402, as shown in FIG. 5. If the next ID number sent from the tag logger 22 is '109', the outgoing ID list assembler 23 increments the transmission sequence number 401 by '1', writes '2' as a new transmission sequence number 401, and writes '109' as the corresponding ID number 402.

The outgoing ID list assembler 23 does not know how many ID numbers it will receive from the tag logger 22, so after receiving each ID number, it queries the reading commander 24 to find out whether there still is a lottery number to be sent to the tag logger 22. When informed that there are no further lottery numbers, the outgoing ID list assembler 23 sends the information stored in the outgoing ID number memory 23*a* to the transmitter 25.

When storing information in the outgoing ID number memory 23*a*, the outgoing ID list assembler 23 does not store an ID number 402 that is already stored in the outgoing ID number memory 23*a*. For example, if the outgoing ID list assembler 23 receives ID numbers '107', '109', '107', '111' in this sequence from the tag logger 22, it stores transmission sequence number '1' and ID number '107' as the first entry in the outgoing ID number memory 23*a*, and transmission sequence number '2' and ID number '109' as the next entry. Next, the outgoing ID list assembler 23 receives ID number '107' again, but as ID number ID number '107' is already stored in the outgoing ID number memory 23*a* with transmission sequence number '1', the outgoing ID list assembler 23 skips the second '107' and stores transmission sequence number '3' and ID number '111' as the next entry in the outgoing ID number memory 23*a*.

The transmitter 25 receives the information sent from the outgoing ID list assembler 23, and submits it to the wireless tag status inference apparatus 30 via the network 40.

The network 40 connects the wireless tag reader 20 to the wireless tag status inference apparatus 30. Any connection protocol may be employed. Alternatively, the wireless tag reader 20 may be connected by a direct link to the wireless tag status inference apparatus 30, without using the network 40.

The wireless tag status inference apparatus 30, which receives information from the wireless tag reader 20 and infers the operational status of the wireless tags 101, comprises a receiver 31, a wireless tag information storage unit, referred to below as a tag information memory 32, a log compiling unit 33, and a tag status inference unit 34. The wireless tag status inference apparatus 30 may be configured by installing a wireless tag status inference program in an information processing apparatus such as a computer. Either distributed processing or centralized processing may be employed in this configuration.

The receiver 31 receives lists of outgoing ID numbers (e.g., the list in FIG. 5) from the wireless tag reader 20 via the network 40, and submits them to the log compiling unit 33.

The tag information memory 32 stores information such as the ID numbers of the wireless tags 101 to be maintained and the geographical coordinates of the locations at which they are installed. FIG. 6 shows an example of this information. The ID numbers 501 are the ID numbers of the wireless tags to be maintained. The installation location information 502 represents the installation locations of the wireless tags with the corresponding ID numbers 501. In the example shown, location is represented by latitude and longitude coordinates, but the installation location information 502 may be represented by any scheme that pinpoints the location of the wireless tags.

The log compiling unit 33 compiles information on the usage of the wireless tags 101 based on the information sent from the receiver 31, and submits it to the tag status inference unit 34. The log compiling unit 33 includes a tag log 33*a*.

The tag log 33*a* is a temporary storage area for information that the log compiling unit 33 provides to the tag status inference unit 34. Referring to FIG. 7, the tag log 33*a* is organized as a table of ID numbers 601 and log counts 602. The ID numbers 601 are identical to the ID numbers 501 stored in the tag information memory 32. The log counts 602 indicate the number of times that the ID numbers 601 have been submitted by the wireless tag reader 20 to report that the wireless tags have been read. Initially, all of the log counts 602 may be zero.

The log compiling unit 33 initializes the information stored in the tag log 33*a* according to the information in the tag information memory 32. Initialization may involve copying the ID numbers 501 from the tag information memory 32 into the ID number column in the tag log 33*a*, and entering '0' as the log count 602 of each ID number 601 as shown in the FIG. 7, for example.

The log compiling unit 33 receives information of the type shown in the FIG. 5 from the wireless tag reader 20, and updates the information stored in the tag log 33*a* according to the received information. When an ID number ID number 402 received from the wireless tag reader 20 matches an ID number 601 in the tag log 33*a*, the log compiling unit 33 updates the corresponding log count 602 by incrementing its value by '1'. From the initial state shown in FIG. 7, for example, if the ID numbers '107', '109', '111', '105', '108' and '110' are received by the receiver 31, the log compiling unit 33 changes the log counts 602 corresponding to ID numbers '107', '109', '111', '105', '108' and '110', from '0' to '1' in the tag log 33*a*, as shown in FIG. 8.

The tag status inference unit 34 receives the information stored in the tag log 33*a* from the log compiling unit 33, and infers the status of the wireless tags based on the received information. For example, the tag status inference unit 34 may search for '0' values in the information stored in the tag log 33*a*, which it receives from the log compiling unit 33, and infer that the wireless tags 101 having corresponding ID numbers 601 may be inoperable because they have not been logged, i.e., they have not been confirmed to operate.

The tag status inference unit 34 may output the results of its inferences via any output means (not shown in the drawing): for example, it may display the results on a display unit, store the results in a memory unit such as a disk memory unit, or print the results on a printing unit such as a printer. The results may be output as, for example, a list of unlogged wireless tag ID number and the corresponding installation location information 502 stored in the tag information memory 32.

After output of the results, the log counts in the tag log 33*a* may be cleared to zero in preparation for the next logging and inference process. Tag status inferences may then be made at periodic intervals, which may be fixed or variable. For example, the tag status inference unit 34 may determine the status of the wireless tags 101 after the passage of a predetermined interval of time from the clearing of the log counts, or from the first reception of log data by the log compiling unit 33 after the clearing of the log counts. Alternatively, the tag status inference may be made when the log compiling unit 33 has received a predetermined amount of log data. Any scheduling method that provides the tag status inference unit 34 with an adequate amount of data on which to make inferences may be used.

The operation of the wireless tag status inference system in the first embodiment will now be described.

Figure 9:
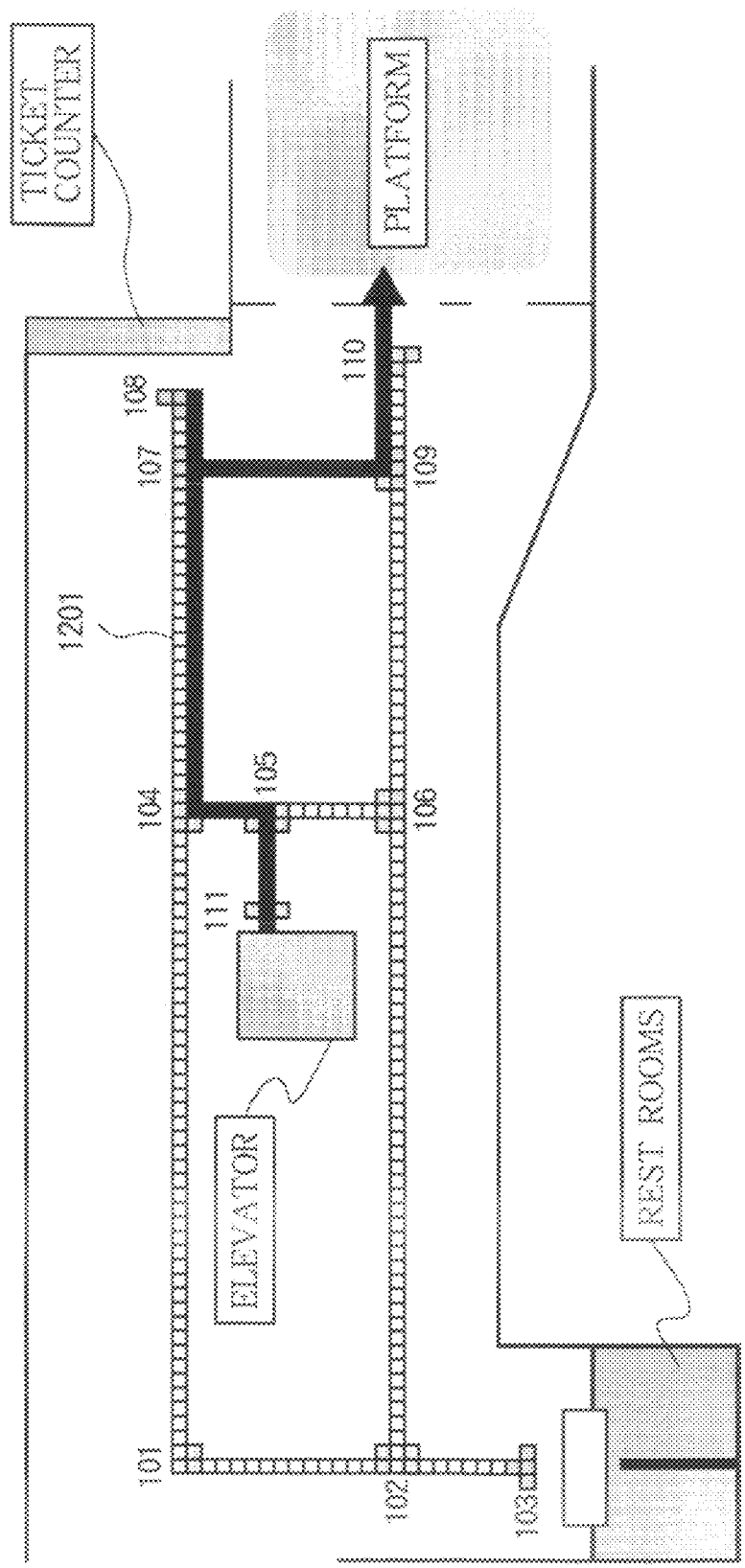
FIG. 9 shows exemplary locations of wireless tags in the first embodiment and an exemplary route taken by a pedestrian.

It will be assumed that eleven wireless tags 101-111 have been installed at a railway station as shown in FIG. 9, and that wireless tags 104 and 106 are inoperable. The user of the wireless tag reader 20 will be assumed to follow the route 1201 indicated by the dark line, encountering wireless tags 111, 105, 104, 107, 108, 107, 109, 110 in this sequence. The wireless tag reader 20 acquires the ID numbers of the wireless tags in this sequence, except that it does not acquire the ID number of inoperable wireless tag 104. The reference numerals of the wireless tags 101 to 111 will be used as their ID numbers. For example, the ID number of wireless tag 111 is '111'.

Figure 10:
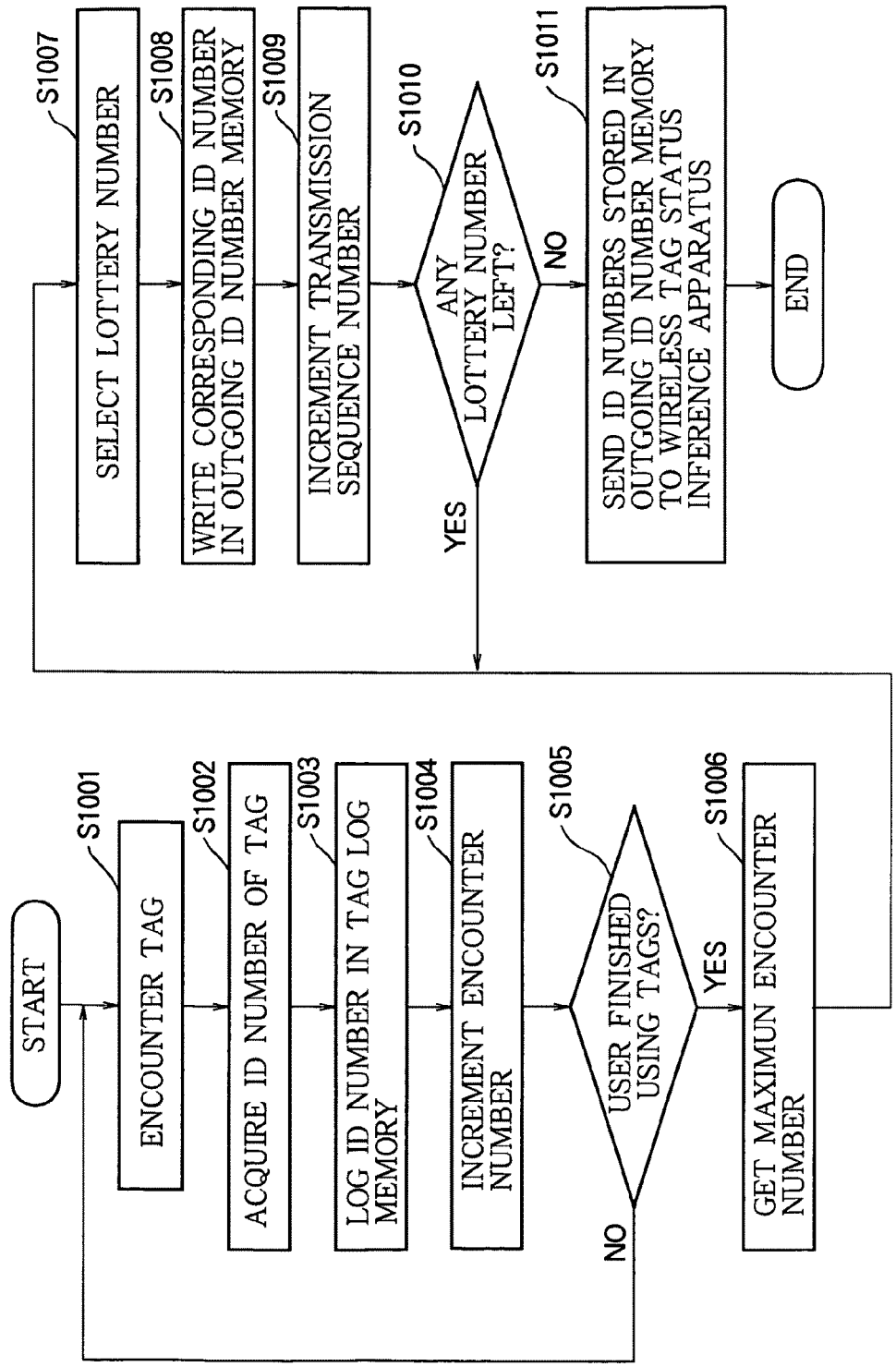
FIG. 10 is a flowchart illustrating the process by which a wireless tag reader reads the identification numbers of wireless tags and sends them to the wireless tag status inference apparatus in the first embodiment.

At the start of the procedure in FIG. 10, the tag log memory 22a and outgoing ID number memory 23a are empty.

Referring to the flowchart in FIG. 10, as the user of the wireless tag reader 20 traverses route 1201 (S1001), the wireless tag communication unit 21 in the wireless tag reader 20 acquires the ID number of each encountered wireless tag and sends the ID number to the tag logger 22 (S1002). In the first encounter, for example, the wireless tag communication unit 21 interrogates wireless tag 111 and the tag logger 22 receives its ID number '111'.

The tag logger 22 logs each received ID number by writing it in the tag log memory 22a, assigning it the lowest available encounter number (S1003). First, for example, the tag logger 22 writes ID number '111' in the tag log memory 22a, assigning it encounter number '1'.

The tag logger 22 keeps track of the value of the lowest available encounter number, and increments this value by one each time it writes an ID number in the tag log memory 22a (S1004). When the tag logger writes the first ID number '111', for example, it increments the value of the lowest available encounter from '1' to '2', so that the next ID number received will be assigned encounter number '2'.

When the user of the wireless tag reader 20 leaves the neighborhood of a wireless tag, if the user proceeds to another wireless tag, the process returns to step S1001 and another ID number is logged. If the user leaves the area in which the wireless tags are installed, the tag logger 22 detects this from the elapse of a predetermined interval of time in which the user does not receive further guidance and the wireless tag communication unit 21 does not supply any further tag ID numbers. The tag logger 22 then decides that the user has finished using the wireless tags (S1005) and proceeds to the next step (S1006).

At this point the tag log memory 22a stores the data shown in FIG. 3.

Following the decision that the user has finished using the wireless tags in step S1005, the tag logger 22 sends the maximum encounter number 201 to the reading commander 24 (S1006). In this example, ID numbers have been acquired seven times, so the maximum encounter number is '7'.

When the reading commander 24 receives the maximum encounter number 201, it selects a random lottery number from '1' to the maximum encounter number ('7' in this case), and sends the lottery number to the tag logger 22. The tag logger 22 retrieves the ID number 202 having this lottery number as its encounter number 201 from the tag log memory 22a, and sends the retrieved ID number 202 to the outgoing ID list assembler 23 (S1007). The outgoing ID list assembler 23 receives the ID number 202 and writes it into the outgoing ID number memory 23a, assigning it the lowest available transmission sequence number 401 (S1008), then increments the value of the lowest available transmission sequence number 401 in preparation for reception of the next ID number (S1009).

The outgoing ID list assembler 23 now queries the reading commander 24 as to whether there is still a lottery number to be sent to the tag log memory 22a (S1010). If the outgoing ID list assembler 23 receives an affirmative response, the process returns to step S1007 and the above operations are repeated, the ID number having the next lottery number as its encounter being written in the outgoing ID number memory 23a together with the incremented transmission sequence number. When there are no more lottery numbers to be sent, the outgoing ID list assembler 23 proceeds to the next step (S1011). At this point, in the present example the outgoing ID number memory 23a stores the data shown in FIG. 5.

In step S1011, the information stored in the outgoing ID number memory 23a is sent to the transmitter 25, and the transmitter 25 sends the received information to the wireless tag status inference apparatus 30 via the network 40.

Figure 11:
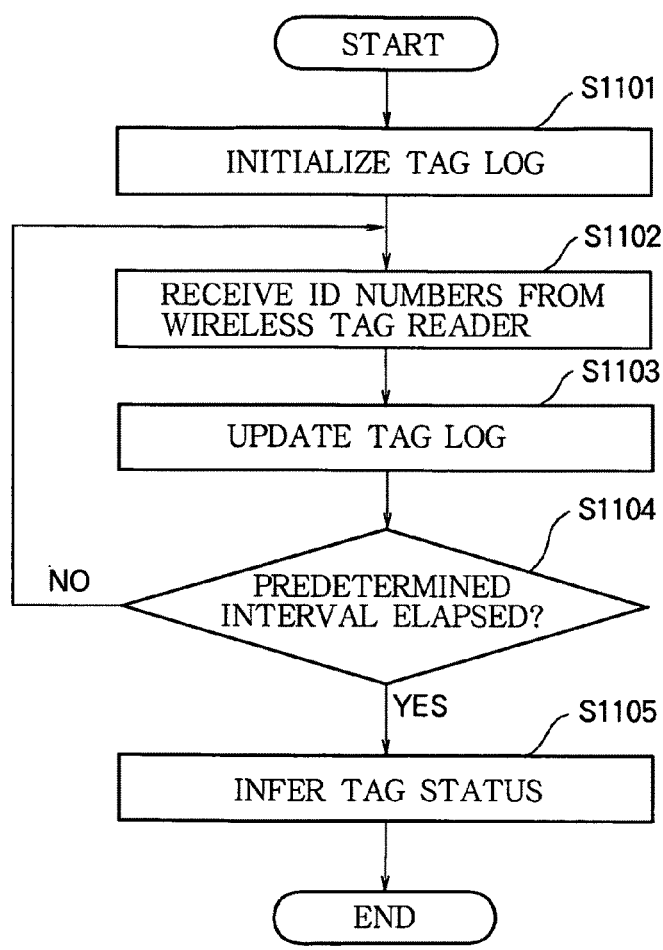
FIG. 11 is a flowchart illustrating the process by which the wireless tag status inference apparatus infers the status of wireless tags from information supplied by wireless tag readers.

FIG. 11 is a flowchart illustrating the process by which the wireless tag status inference apparatus infers the status of wireless tags from information supplied by wireless tag readers.

The ID numbers '101', '102', '103', '104', '105', '106', '107', '108', '109', '110', and '111' are stored in advance in the tag information memory 32 of the wireless tag status inference apparatus 30, as shown in FIG. 6. At periodic intervals, the log compiling unit 33 initializes the tag log 33a as shown in FIG. 7, based on the information stored in the tag information memory 32. In the initial state, the tag log 33a stores ID number '101' and log count '0', ID number '102' and log count '0', ID number '103' and log count '0', and so on.

The receiver 31 of the wireless tag status inference apparatus 30 receives the wireless tag ID numbers stored in the outgoing ID number memory 23a from the transmitter 25 of the wireless tag reader 20 as shown in FIG. 5, and submits this information to the log compiling unit 33 (S1102).

The log compiling unit 33 accordingly receives the ID numbers 402 shown in FIG. 5, and updates the log counts 602 of the corresponding ID numbers 601 in the tag log 33a (S1103) by adding '1'. As the result, the log counts 602 corresponding to ID numbers '105', '107', '108', '109', '110', and '111' in the tag log 33a change from '0' to '1'. The log counts 602 corresponding to the other ID numbers 601 remain '0'.

The log compiling unit 33 now determines whether a predetermined monitoring interval has elapsed from the initialization of the tag log 33a (S1104). If the predetermined monitoring interval has not elapsed, the log compiling unit 33 returns to step S1102 and continues to receive log reports sent from wireless tag readers and to operate as described above. When the log compiling unit 33 determines that the predetermined monitoring interval has elapsed in step S1104, it proceeds to the next step (S1105).

Figure 12:
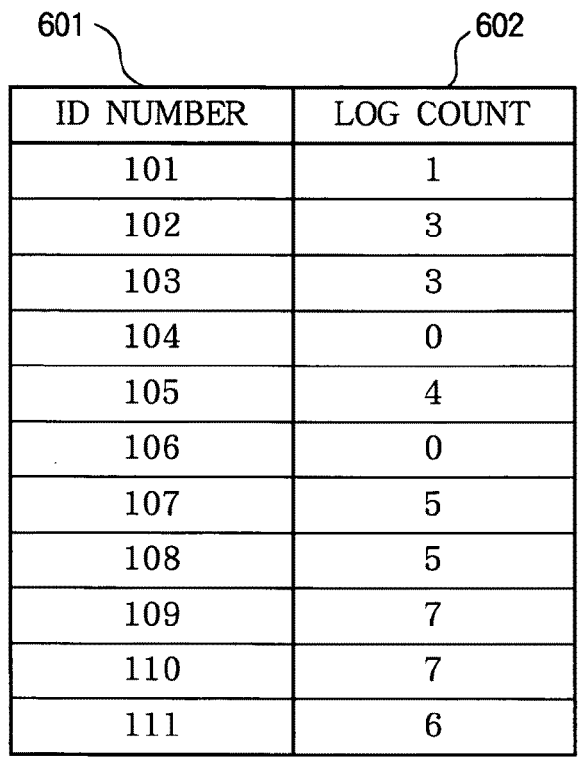
FIG. 12 is an exemplary table of information, acquired from a plurality of wireless tag readers, stored in the tag log in the wireless tag status inference apparatus.
Figure 13:
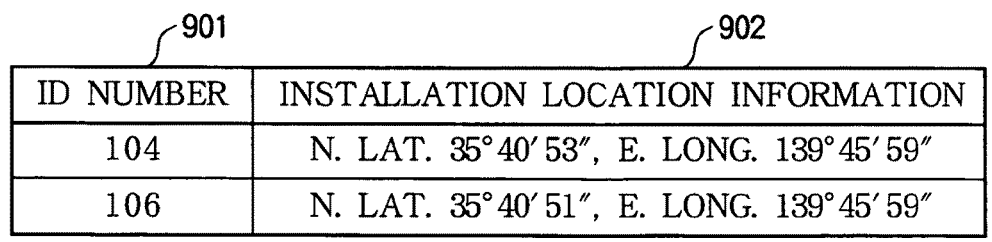
FIG. 13 is an exemplary table of results obtained by the tag status inference unit in the first embodiment.

In this next step (S1105), the tag status inference unit 34 receives the information stored in the tag log 33a from the log compiling unit 33, and determines the status of wireless tags 101 to 111. In this case, the log counts 602 corresponding to ID numbers '104' and '106' in the tag log 33a have '0' values and the log counts 602 corresponding to other ID numbers 601 have '1' values, as shown in FIG. 12. The tag status inference unit 34 notes that the operation of wireless tags having ID numbers 601 corresponding to log counts '0' has not been confirmed and infers that wireless tags 104 and 106 may be inoperable. The installation location information 502 stored in the tag information memory 32 is added to the ID numbers of the suspected inoperable wireless tags 104 and 106, and the tag status inference unit 34 outputs the ID numbers 901 and the installation location information 902 as shown in FIG. 13 via an output unit (S1105).

After the output of these inferred results, the log compiling unit 33 may repeat the entire procedure, starting from the initialization step (S1101), to continue monitoring the status of the wireless tags.

The first embodiment has the following effects.

When the user of the wireless tag reader 20 uses the wireless tag reader 20 to read an arbitrary wireless tag 101 and acquire information from the guidance information center, the wireless tag status inference apparatus 30 logs the usage of the wireless tag 101 in the tag log 33a. The tag status inference unit 34 extracts information from the tag log 33a to infer the status of each wireless tag 101. If a wireless tag has not been logged, an inference is made that the wireless tag may be inoperable.

Since the wireless tag communication unit 21 may fail to communicate with a wireless tag because the distance between the wireless tag reader 20 and the wireless tag is too great or because the wireless tag reader 20 was within range of the wireless tag for too short a time for communication to take place, even when a wireless tag is encountered but not been logged, that does not necessarily mean that the wireless tag 101 is inoperable; an inspection visit is necessary to determine whether the wireless tag is operable or not. On the other hand, when a wireless tag 101 is logged, it can be definitely concluded that the wireless tag is operable. Maintenance personnel therefore have to inspect only the unlogged wireless tags, instead of inspecting all of the wireless tags. This arrangement saves a great deal of maintenance time.

The tag logger 22 and outgoing ID list assembler 23 send the wireless tag status inference apparatus 30 the ID numbers of the wireless tags 101 accessed by the wireless tag reader 20 in a sequence different from the sequence in which the ID numbers have actually been read. The user of the wireless tag status inference apparatus 30 accordingly cannot trace the course followed by the user of the wireless tag reader 20. Further protection against tracing is provided because the wireless tag reader 20 sends each ID number acquired during a traverse to the wireless tag status inference apparatus 30 only once, even when the same wireless tag is visited more than once during the traverse. The user of the wireless tag reader 20 can accordingly provide information to the wireless tag status inference apparatus 30 without anxiety about loss of privacy.

Since the status of the wireless tags can be monitored at a maintenance center by means of data obtained from pedestrians who encounter the wireless tags, maintenance personnel can keep track of the status of the wireless tags without making inspection tours. Since the data indicating the wireless tags read by the pedestrians' tag readers is randomized before transmission to the maintenance center, the pedestrians' privacy is protected.

Second Embodiment

The wireless tag status inference system in the second embodiment is identical to the wireless tag status inference system in the first embodiment, except that the tag status inference unit 34, instead of simply inferring that a wireless tag 101 may be inoperable if it fails to be logged, assigns a probability to each inference.

As an example, it will be assumed that a plurality of wireless tags are installed in the vicinity of the wireless tag in question, and the maximum number of times any of these wireless tags has been logged (the maximum log count 602 in FIG. 7) is '3'. 'Vicinity' is defined as described later. If the wireless tag reader 20 is an electronic cane possessed by a visually impaired user, it can be inferred that the user has encountered the wireless tag in question at most three times. Depending on how the cane is held, a tag may be read more than once at a single encounter, or may not be read at all, so the number of times a tag is logged is not necessarily equal to the number of times it has been encountered. The maximum count of '3' accordingly may not have been produced by exactly three encounters; all that can be said with complete certainty is that a wireless tag in the vicinity of the tag in question has been encountered at least once. Nevertheless, the maximum count gives at least a rough idea of the number of times the wireless tag in question is likely to have been encountered.

In the second embodiment, when a wireless tag is inferred to be inoperable, the frequency with which other wireless tags in its vicinity have been logged is used to assign a degree of reliability, referred to below as an 'inferential probability', to the inference. If the tags in the vicinity of the tag in question have been logged frequently, the tag in question should also have been logged frequently, so if it has not been logged at all, it is very likely to be inoperable. In general, the more often the wireless tags in the vicinity of the tag in question are logged, the more accurately the status of the tag in question can be determined.

The difference between the first embodiment and the second embodiment is accordingly that the tag status inference unit 34 in the wireless tag status inference apparatus 30 in the second embodiment assigns levels of inferential probability to the unlogged wireless tags.

Next, an exemplary configuration in which the tag status inference unit 34 assigns levels of inferential probability to wireless tags will be described.

In the following description, inferential probabilities are calculated in terms of a basic unit 'T'. This basic inferential probability T is related to the inherent likelihood of failure of the wireless tags, and can be measured by actual tests in the configuration of the wireless tag status inference system 10 described in the first embodiment, or can be calculated from the technical specifications of the wireless tags. Any method and any parameter values may be used in determining the basic inferential probability T. The inferential probability of an unlogged wireless tag is defined to be proportional to the basic inferential probability T and the maximum log count M (the maximum log count 602 in FIG. 7) of the wireless tags in the vicinity of the unlogged wireless tag. The inferential probability can be represented in the following equation.

$$\text{Inferential probability of inoperability} = M \cdot T \quad (1)$$

The above equation (1) is one exemplary formula for obtaining the inferential probability of an inoperability inference. Alternative methods are available, based on the mean log count of all the wireless tags except the unlogged tag in question in a given area, for example, or on other statistics of the log counts of the wireless tags in the vicinity of the tag in question.

Figure 14:
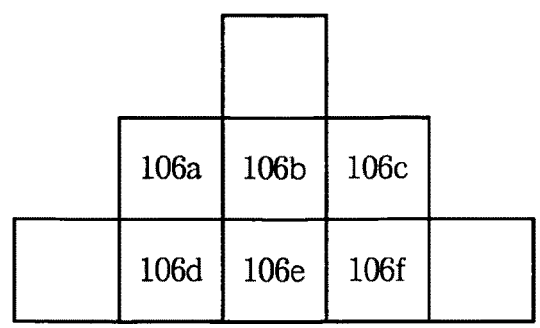
Figure 15:
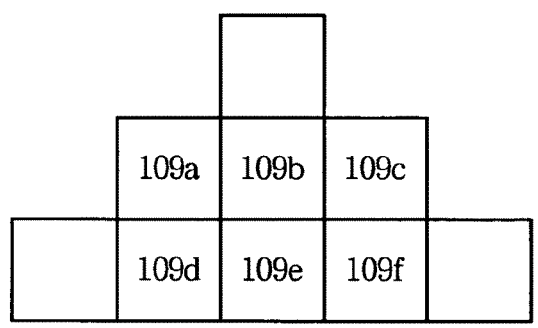
Figure 16:
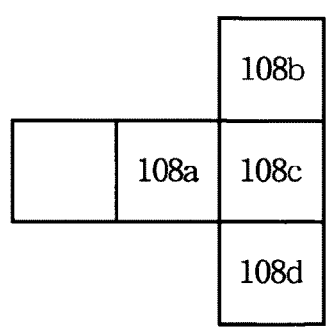

The vicinity on which the inferential probability is based should be an area in which all tags can be expected to be logged substantially equal numbers of times. In the arrangement shown in FIG. 9, for example, instead of individual wireless tags 101 to 111, a group of wireless tags may be installed at each of the eleven indicated locations 101-111, and each of these groups may constitute a vicinity. One such vicinity is shown in FIG. 14, comprising six wireless tags 106a-106f which may be installed together in place of wireless tag 106 in FIG. 9. A similar vicinity is shown in FIG. 15, comprising six wireless tags 109a-109f which may be installed in place of wireless tag 109 in FIG. 9. A smaller vicinity is shown in FIG. 16, comprising four wireless tags 108a-108d which may be installed in place of wireless tag 108 in FIG. 9.

Figure 17:
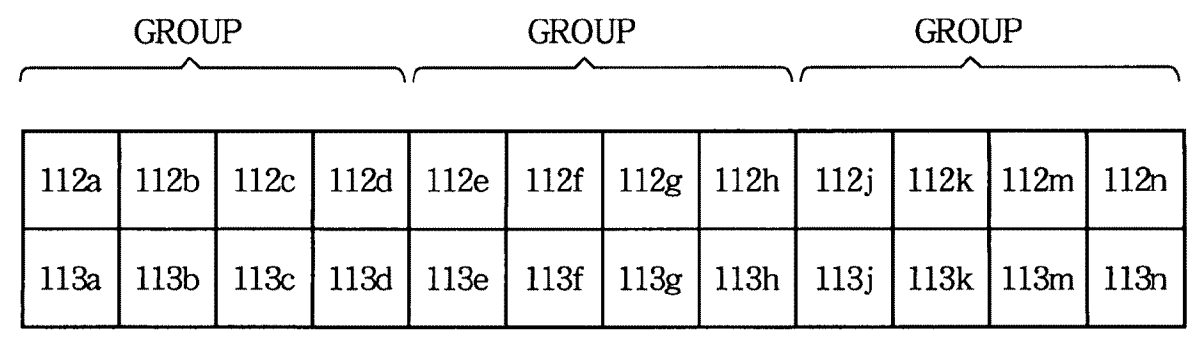

An unnecessarily wide area should not be defined as a vicinity, because different wireless tags in such an area are likely to be logged different numbers of times, and the maximum log count M will not be a good indicator of inferential probability for a wireless tag that has a tendency to be read less often. When the wireless tag reader 20 is an electronic cane for a visually impaired person, a vicinity may be limited to a range that can be covered by one swing of the cane. If a group of twenty-four wireless tags are installed in guidance blocks at a wide pedestrian crossing as shown in FIG. 17, for example, the group can be divided into several sub-groups, each sub-group constituting one vicinity group. Alternatively, vicinity groups may be defined according to the performance of the wireless tag reader 20 in the wireless tag status inference system 10 (for example, the range over which the wireless tag reader 20 can communicate with a wireless tag).

The tag status inference unit 34 may identify the wireless tags in a vicinity group from the installation location information 502 stored in the tag information memory 32 in the tag status inference unit 34 for each wireless tag. The wireless tags located within a predetermined distance of an unlogged wireless tag may be defined as belonging to the same vicinity group. For example, the vicinity group of an unlogged wireless tag may be defined as the wireless tags located at the same latitude and longitude, expressed in seconds, or as the wireless tags having latitude and longitude values that differ from the latitude and longitude of the unlogged tag by five seconds or less. Alternatively, the wireless tag status inference apparatus 30 may have a memory that stores information (e.g., ID numbers) identifying the wireless tags in the vicinity group of each wireless tag. Any scheme may be used to define the vicinity groups.

The wireless tag status inference apparatus 30 may output information giving the inferential probability of inoperability of each wireless tag, or it may output information listing the unlogged wireless tags arranged in order of their inferential probability of inoperability. This information may be output from the tag status inference unit 34 by any means (not shown): for example, the information may be output on a display unit, stored in a memory unit such as a disk drive, or printed by a printer.

The calculation of inferential probabilities in the second embodiment will now be further described.

Figure 18:
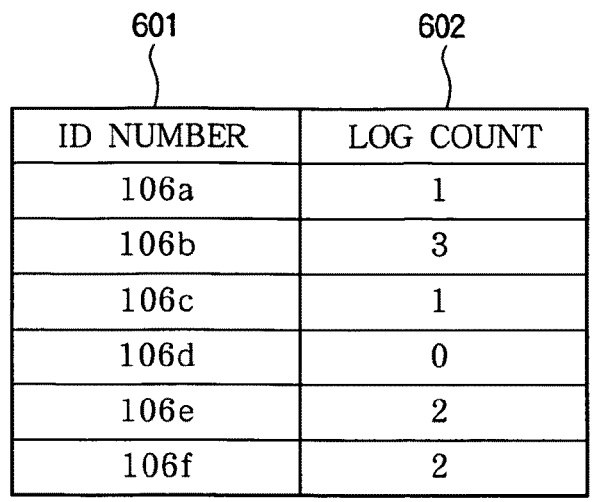
FIGS. 18 and 19 are exemplary tables of information stored in the tag log in the wireless tag status inference apparatus in the second embodiment.

Suppose, for example, that the tag log 33a stores the information shown in FIG. 18 for the six wireless tags 106a-106f shown in FIG. 14. Since the log count 602 of wireless tag 106d is '0', the tag status inference unit 34 recognizes wireless tag 106d as an unlogged wireless tag. The tag status inference unit 34 identifies wireless tags 106a, 106b, 106c, 106e, and 106f as tags in the vicinity of the unlogged wireless tag 106d. Of these tags, wireless tag 106b has been logged most frequently (three times), so the maximum log count M in the above equation (1) is '3', and the inferential probability of inoperability of wireless tag 106d is calculated as $M \cdot T = 3 \cdot T$.

Figure 19:
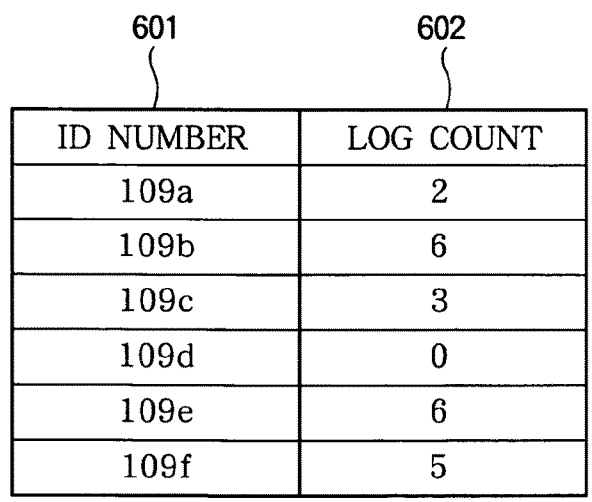

Similarly, suppose that the tag log 33a stores the information shown in FIG. 19 for the six wireless tags 109a-109f in FIG. 15. Since the log count 602 of wireless tag 109d is '0', the tag status inference unit 34 recognizes wireless tag 109d as an unlogged wireless tag. The tag status inference unit 34 identifies wireless tags 109a, 109b, 109c, 109e, and 109f as tags in the vicinity of the unlogged wireless tag 109d. Since wireless tags 109b and 109e have been read out most often in this range (six times), the maximum log count M in the above equation (1) is '6', and the inferential probability of inoperability of wireless tag 109d is calculated as $M \cdot T = 6 \cdot T$.

Since the inferential probability of inoperability is $3 \cdot T$ for wireless tag 106d and $6 \cdot T$ for wireless tag 109d wireless tag 109d has a higher likelihood of being inoperable than wireless tag 106d.

The second embodiment has the following effects.

In the second embodiment, since the inferential probability of inoperability of an unlogged wireless tag depends on the log counts of the wireless tags in its vicinity (for example, on the maximum log count M), the inferential probability is a numerical value associated with the frequency with which the tags in the vicinity are used. Unlogged tags having a high inferential probability of inoperability thus also tend to be wireless tags that are heavily used. The wireless tags can therefore be efficiently maintained by making prompt inspections of these wireless tags, and dealing with wireless tags with lower inferential probabilities of inoperability as time permits.

Third Embodiment

The third embodiment has the same general hardware configuration as the first and second embodiments, shown in FIG. 2.

In the system for inferring the status of wireless tags in the second embodiment, the tag status inference unit 34 identified the wireless tags in the vicinity of an unlogged wireless tag on the basis of information such as geographical coordinates stored in the tag information memory 32 when the wireless tags are installed. In the third embodiment, the tag information memory 32 uses a hierarchical numbering system that facilitates vicinity identifications and other aspects of the management of the installed wireless tags. Aside from this hierarchical system, the third embodiment is identical to the second embodiment, so only the differences between the second embodiment and third embodiment will be described below.

The third embodiment will be described in relation to the same wireless tags as the second embodiment, installed at the locations shown in FIG. 9 and FIGS. 14-16.

FIG. 20 shows an example of information stored in the tag information memory 32 in the third embodiment. The installation location information 502 has a hierarchical structure representing area, sub-area, wireless tag location, and sub-number.

'Area' designates the general location or facility where a wireless tag is installed.

Figure 21:
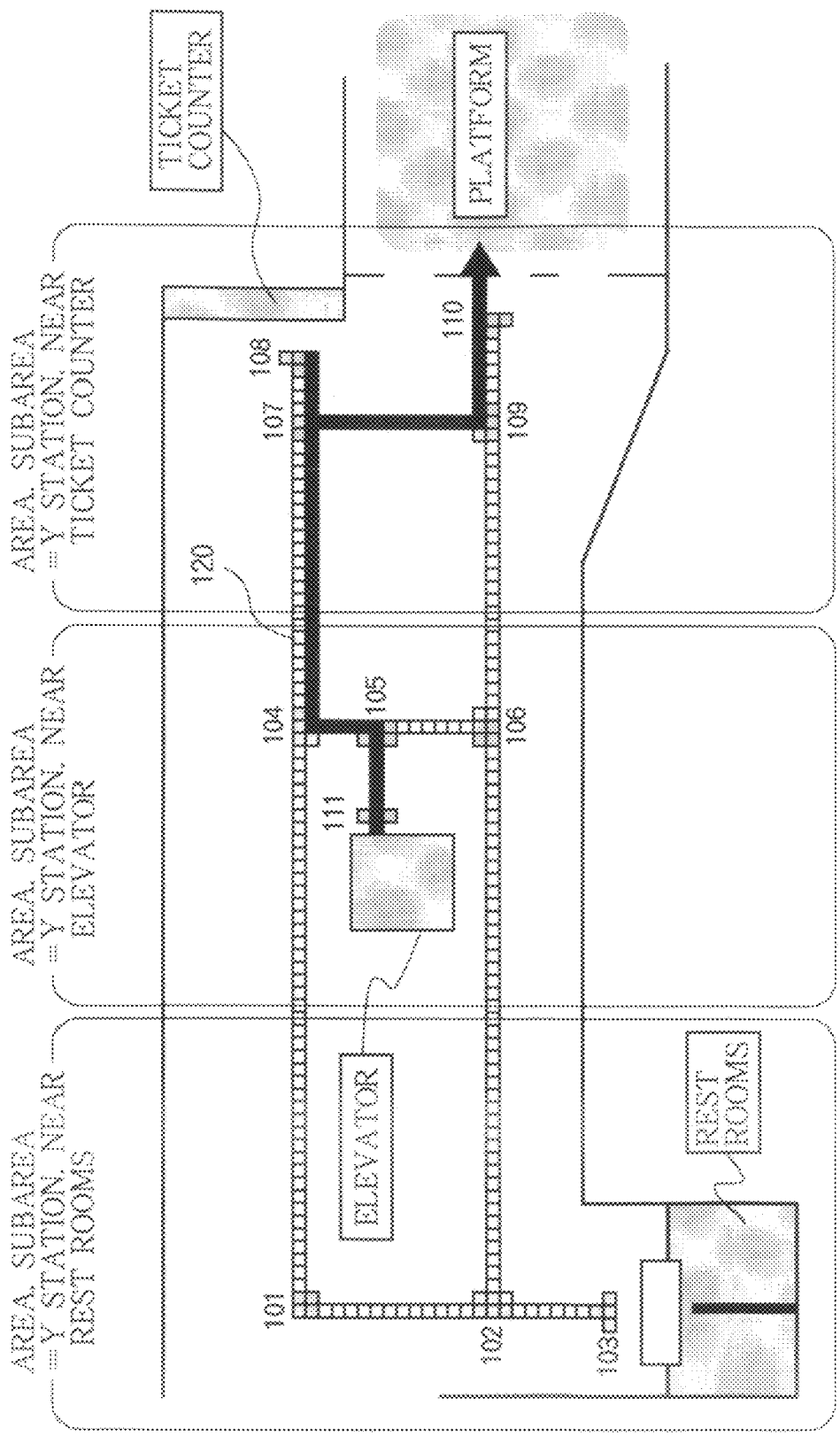
FIG. 21 shows an exemplary area divided into subareas in the third embodiment.

'Sub-area' designates a more specific location in an area. For example, a sub-area may be a specific room in a building, or a specific part of some other type or area. The railroad station area in FIG. 9, for example, may be divided into one sub-area near the ticket counter and platform, another sub-area near the elevator, and yet another sub-area near the rest rooms, as shown in FIG. 21.

'Wireless tag position' is a number assigned to one wireless tag or a group of tags installed at the same place and providing the same guidance function. The wireless tags shown in FIG. 14, which are installed at a position 106 in FIG. 21 where the path branches in three directions, are one example of such a group. When a large number of wireless tags are installed at one place, they may be divided into groups of appropriate size, as in FIG. 17, and a different wireless tag position number may be assigned to each group. A group of wireless tags having the same wireless tag position number corresponds to a vicinity group in the second embodiment.

A different 'sub-number' is assigned to each wireless tag in the group of tags installed at the same wireless tag position, to identify the individual tags.

The hierarchical numbering system in FIG. 20 is exemplary; other hierarchical systems can be used instead. The hierarchy may have more than four levels, for example, or fewer than four levels. The vicinity group need not correspond to the penultimate level ('wireless tag position' in FIG. 20); a higher level may used to designate vicinity groups. For example, there may be a 'sub-position' level between the 'wireless tag position' and 'sub-number' levels, with the wireless tags in the same wireless tag position still forming a single vicinity group. The area, sub-area, and position designations may also be replaced with different designations.

The process by which wireless tags in the vicinity of an unlogged wireless tag are extracted in the third embodiment will now be described. It will be assumed that the wireless tags having the same wireless tag position designation form a vicinity group.

The wireless tags 106a-106f listed in FIG. 20 accordingly form a single vicinity group (FIG. 14). Wireless tag 106a, for example, is represented by area='Y station', sub-area='near elevator', wireless tag position='1', and sub-number='1'. The other wireless tags in this vicinity group have the same area, sub-area, and wireless tag position designations, but different sub-numbers. Accordingly, when the tag status inference unit 34 selects the tags in the vicinity of wireless tag 106a, it selects wireless tags 106b-106f, which have the same wireless tag position ('1').

Figure 22:
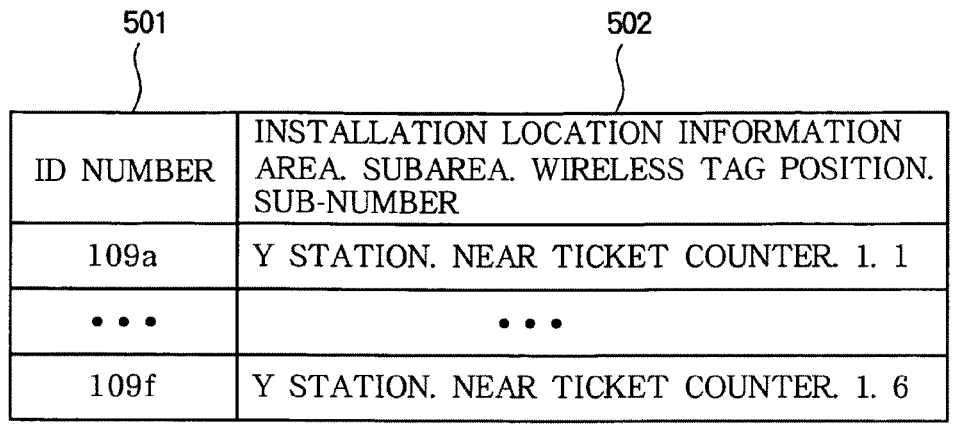
FIGS. 22 and 23 show further examples of information stored in the tag information memory in the third embodiment.

FIG. 22 shows part of the information listed for wireless tags 109a to 109f (FIG. 15) in the tag information memory 32. All of these wireless tags have the same wireless tag position number ('1'). Accordingly, when the tag status inference unit 34 selects the tags in the vicinity of wireless tag 109a, it selects wireless tags 109b-109f.

Figure 23:
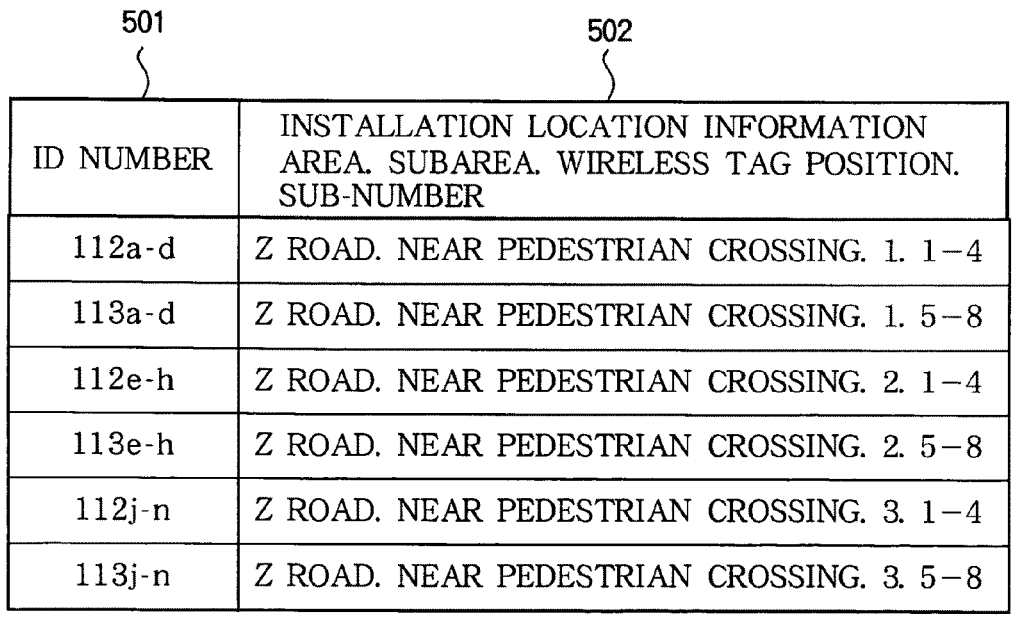

FIG. 23 shows an example of information stored in the tag information memory for wireless tags 112a-112n and wireless tags 113a-113n in FIG. 17. All of these tags have the same area and sub-area designations. Wireless tags 112a-112d and 113a-113d have wireless tag position number '1' and sub-numbers '1' to '8'. Wireless tags 112e-112h and 113e-113h have wireless tag position number '2' and sub-numbers '1' to '8'. Wireless tags 112j, 112k, 112m, 112n, 113j, 113k, 113m, and 113n have wireless tag position number '3' and sub-numbers '1' to '8'. Accordingly, when the tag status inference unit 34 selects the tags in the vicinity of wireless tag 112a, it selects wireless tags 112b-112d and 113a-113d.

The third embodiment has the following effect.

In the third embodiment, since the tag information memory 32 stores the installation location information 502 in a hierarchical numbering system such as the area, sub-area, wireless tag position, and sub-number system shown in FIG. 20, if the tag arrangement is changed by adding tags, removing tags, or moving tags to new locations), the information about the tags can be updated by altering only the relevant items, without disrupting the entire numbering system. Thus, this configuration facilitates the operation of the tag status inference unit 34 because despite changes in the tag information memory 32, the numbering information continues to represent the vicinities of the wireless tags accurately.

The invention is not limited to the foregoing embodiments. Some of the possible variations are described below.

In the above embodiments, in order to remove evidence of the movements of the user of the wireless tag reader 20, the reading commander 24 randomizes the order of the ID numbers acquired from the wireless tags with which the wireless tag reader 20 has communicated, and sends the wireless tag status inference apparatus 30 a data set in which the ID number of each logged wireless tag 101 appears only once, but other methods can be used instead. For example, the ID numbers can be re-arranged in a fixed order, such as ascending order or descending order; all ID numbers read from the wireless tags may be sent to the wireless tag status inference apparatus 30 the same number of times (not necessarily just once); or the number of times an ID number is sent may be arbitrarily varied. For example, if the ID numbers are represented in binary code, an ID number may be sent once if its least significant digit is '0', and twice if its least significant digit is '1'. The wireless tag status inference apparatus 30 should then process the ID number in the same way regardless of whether it has been sent once or twice.

In the above embodiments, information representing the movement of the user of a wireless tag reader 20 is randomized by a lottery number scheme involving the tag logger 22, outgoing ID list assembler 23, and reading commander 24 in the wireless tag reader 20, but the randomization may be performed by a separate apparatus provided between the wireless tag reader 20 and the wireless tag status inference apparatus 30. In this case, the separate apparatus may receive non-randomized information from the wireless tag reader 20 and remove any information that might identify the wireless tag reader 20, as well as randomizing the sequence of the ID numbers of the wireless tags 101, before sending the information to the log compiling unit 33.

In the above embodiments, the wireless tag status inference apparatus 30 uses the tag status inference unit 34 to infer the operational status of the wireless tags 101, but the data stored in the tag log 33a may be mined for other purposes. For example, a system administrator may use the wireless tag status inference apparatus 30 to find out how frequently different wireless tags 101 are used, and then use this information to design a more effective arrangement of the wireless tags 101, in order to provide more effective guidance to the user of the wireless tag reader 20. Frequency-of-usage data may also be used to plan efficient routine maintenance. For example, wireless tags that are used more frequently tend to be stepped on more frequently and thus to have shorter service lives, so they can be replaced on a shorter schedule than other wireless tags. Wireless tags that are rarely or never used can be allowed to remain inoperable instead of being replaced. The data in the tag log 33a can also be used for reference when new systems are being planned and designed.

In the above embodiments, the tag status inference unit 34 infers that the wireless tag 101 may be inoperable when its log count 602 in the tag log 33a is '0'. However, the tag status inference unit 34 may infer that the wireless tag 101 may be inoperable when its log count 602 is below a predetermined value.

In the above embodiments, when the wireless tag reader 20 communicates with a wireless tag 101, it acquires only the ID number of the wireless tag 101, but the wireless tag reader 20 may also acquire other information from the wireless tag 101 and send this other information to the wireless tag status inference apparatus 30 as well.

For example, if the wireless tag 101 is an 'active' tag that operates on an internal battery, the wireless tag reader 20 may acquire information indicating the amount of charge left in the battery and send this information to the wireless tag status inference apparatus 30. The wireless tag status inference apparatus 30 can then infer the remaining life of the battery in the wireless tag 101 and identify wireless tags with low batteries, so that their batteries can be replaced or recharged before they run down. The battery charge information helps the user of the wireless tag status inference apparatus 30 plan efficient maintenance, and helps the user of the wireless tag reader 20 by reducing the occurrence of wireless tags that have gone silent because they have run out of power.

In the above embodiments, the transmitter 25 sends information to the wireless tag status inference apparatus 30 as soon as the information is received from the outgoing ID list assembler 23, but the information may be stored and sent later. For example, the information may be sent with a random delay, making it impossible for the user of the wireless tag status inference apparatus 30 to know when the user of the wireless tag reader 20 visited a particular wireless tag 101. The privacy of the user of the wireless tag reader 20 is then further protected, so the user can provide information to the wireless tag status inference apparatus 30 with even less anxiety.

The wireless tags shown in the above embodiments were used for the purpose of aiding visually impaired persons, but the wireless tag status inferring system of the present invention is applicable to systems in which wireless tags are used for other purposes.

Those skilled in the art will recognize that further variations are possible within the scope of the invention, which is defined in the appended claims.

What is claimed is:

1. A wireless tag status inference apparatus for inferring the status of wireless tags disposed along a route traversable by a moving person, the wireless tag status inference apparatus comprising:
   a wireless tag information storage unit for storing information pertaining to the wireless tags;
   a log compiling unit for compiling wireless tag information acquired by an external wireless tag reader from some or all of the wireless tags as the moving person traverses said route; and
   a tag status inference unit for identifying inoperable wireless tags from the information stored in the wireless tag information storage unit and the information compiled by the log compiling unit,
   wherein the tag status inference unit identifies a wireless tag as inoperable if the log compiling unit logs information acquired from the wireless tag less often than a threshold frequency.

2. The wireless tag status inference apparatus of claim 1, wherein the tag status inference unit identifies a wireless tag as inoperable if information pertaining to the wireless tag is stored in the wireless tag information storage unit but the log compiling unit logs information acquired from the wireless tag less often than a threshold frequency.

3. A wireless tag status inference apparatus for inferring the status of wireless tags disposed along a route traversable by a moving person, the wireless tag status inference apparatus comprising:
   a wireless tag information storage unit for storing information pertaining to the wireless tags;
   a log compiling unit for compiling wireless tag information acquired by an external wireless tag reader from some or all of the wireless tags as the moving person traverses said route; and
   a tag status inference unit for identifying inoperable wireless tags from the information stored in the wireless tag information storage unit and the information compiled by the log compiling unit,
   wherein the tag status inference unit identifies a wireless tag as inoperable if the log compiling unit does not log any information acquired from the wireless tag over a predetermined period of time.

4. The wireless tag status inference apparatus of claim 1, wherein the tag status inference unit assigns a reliability to its identification of the wireless tag as inoperable, according to frequencies with which the log compiling unit receives information acquired from wireless tags in a vicinity of the wireless tag identified as inoperable.

5. The wireless tag status inference apparatus of claim 4, wherein the reliability is computed as a product of a constant value and a maximum logging frequency among the wireless tags in the vicinity of the wireless tag identified as inoperable.

6. The wireless tag status inference apparatus of claim 4, wherein the wireless tag information storage unit stores information indicating locations of the wireless tags.

7. The wireless tag status inference apparatus of claim 4, wherein the wireless tag information storage unit stores information identifying the tags in a hierarchical system with multiple levels, including a lowest level identifying individual wireless tags, and the wireless tags in the vicinity of the wireless tag identified as inoperable are the wireless tags with identifying information matching the identifying information of the wireless tag identified as inoperable down to a predetermined level in the hierarchical system.

8. A wireless tag reader for sending information to the external wireless tag status inference apparatus of claim 1, the wireless tag reader being usable by a moving person to acquire information from wireless tags disposed along a route traversable by the moving person, the wireless tag reader comprising:
   a first communication device for acquiring said information from any of the wireless tags within communication range of the wireless tag reader; and
   a second communication device for transmitting the information acquired by the first communication device to the external wireless tag status inference apparatus.

9. The wireless tag reader of claim 8, further comprising a processing device for processing the information acquired by the first communication device so as to remove evidence of the route followed by the moving person before the information is transmitted to the external wireless tag status inference apparatus.

10. The wireless tag reader of claim 9, wherein the processing device rearranges the information transmitted to the external wireless tag status inference apparatus in a sequence different from a sequence in which the information was acquired from the wireless tags.

11. The wireless tag reader of claim 10, wherein the processing device rearranges the information in a random sequence.

12. The wireless tag reader of claim 9, wherein the processing device causes information acquired from each wireless tag to be transmitted to the wireless tag status inference apparatus a predetermined number of times, regardless of the number of times information was actually acquired from the wireless tag.

13. The wireless tag reader of claim 8, wherein the information acquired from the wireless tags includes wireless tag identifying information.

14. A wireless tag status inference system comprising a wireless tag status inference apparatus for inferring the status of wireless tags disposed along a route traversable by a moving person and at least one wireless tag reader usable by the moving person to acquire information from the wireless tags, wherein:
   the wireless tag status inference apparatus comprises a wireless tag information storage unit for storing information pertaining to the wireless tags, a log compiling unit for logging wireless tag information acquired by an external wireless tag reader from some or all of the wireless tags as the moving person traverses said route, and a tag status inference unit for identifying inoperable wireless tags from the information stored in the wireless tag information storage unit and the information logged by the log compiling unit; and the wireless tag reader comprises a first communication device for acquiring said information from any of the wireless tags in a vicinity of the wireless tag reader, and a second communication device for transmitting the information acquired by the first communication device to the wireless tag status inference apparatus, wherein the tag status inference unit identifies a wireless tag as inoperable if the log compiling unit logs information acquired from the wireless tag less often than a threshold frequency.

15. A machine-readable tangible medium storing instructions executable by a computing device to infer the status of wireless tags disposed along a route traversable by a moving person, the instructions including:

first instructions causing the computing device to read stored information pertaining to the wireless tags from an information storage unit in the computing device;

second instructions causing the computing device to log wireless tag information acquired by an external wireless tag reader from some or all of the wireless tags as the moving person traverses said route, thereby obtaining logged information; and third instructions causing the computing device to identify inoperable wireless tags from the stored information and the logged information, wherein the third instructions cause the computing device to identify a wireless tag as inoperable if the log compiling unit logs information acquired from the wireless tag less often than a threshold frequency.

16. The wireless tag status inference apparatus of claim 3, wherein the tag status inference unit identifies a wireless tag as inoperable if information pertaining to the wireless tag is stored in the wireless tag information storage unit but the log compiling unit does not log any information acquired from the wireless tag over a predetermined period of time.

17. A wireless tag status inference system comprising a wireless tag status inference apparatus for inferring the status of wireless tags disposed along a route traversable by a moving person and at least one wireless tag reader usable by the moving person to acquire information from the wireless tags, wherein:

the wireless tag status inference apparatus comprises a wireless tag information storage unit for storing information pertaining to the wireless tags, a log compiling unit for logging wireless tag information acquired by an external wireless tag reader from some or all of the wireless tags as the moving person traverses said route, and a tag status inference unit for identifying inoperable wireless tags from the information stored in the wireless tag information storage unit and the information logged by the log compiling unit; and the wireless tag reader comprises a first communication device for acquiring said information from any of the wireless tags in a vicinity of the wireless tag reader, and a second communication device for transmitting the information acquired by the first communication device to the wireless tag status inference apparatus, wherein the tag status inference unit identifies a wireless tag as inoperable if the log compiling unit does not log any information acquired from the wireless tag over a predetermined period of time.

18. A machine-readable tangible medium storing instructions executable by a computing device to infer the status of wireless tags disposed along a route traversable by a moving person, the instructions including:

first instructions causing the computing device to read stored information pertaining to the wireless tags from an information storage unit in the computing device;

second instructions causing the computing device to log wireless tag information acquired by an external wireless tag reader from some or all of the wireless tags as the moving person traverses said route, thereby obtaining logged information; and third instructions causing the computing device to identify inoperable wireless tags from the stored information and the logged information, wherein the third instructions cause the computing device to identify a wireless tag as inoperable if the log compiling unit does not log any information acquired from the wireless tag over a predetermined period of time.

* * * * *